US007995928B2

(12) United States Patent
Du et al.

(10) Patent No.: US 7,995,928 B2
(45) Date of Patent: Aug. 9, 2011

(54) COLLIMATED BALL LENSES FOR OPTICAL TRIPLEXERS

(75) Inventors: Tengda Du, Fremont, CA (US); Bernd Huebner, Santa Clara, CA (US)

(73) Assignee: Finisar Corporation, Sunnyvale, CA (US)

( * ) Notice: Subject to any disclaimer, the term of this patent is extended or adjusted under 35 U.S.C. 154(b) by 745 days.

(21) Appl. No.: 12/031,234

(22) Filed: Feb. 14, 2008

(65) Prior Publication Data

US 2008/0193135 A1 Aug. 14, 2008

Related U.S. Application Data

(60) Provisional application No. 60/889,912, filed on Feb. 14, 2007.

(51) Int. Cl.
*H04B 10/00* (2006.01)
(52) U.S. Cl. .......... 398/138; 398/139; 398/135
(58) Field of Classification Search .......... 398/135–139
See application file for complete search history.

(56) References Cited

U.S. PATENT DOCUMENTS

| | | | |
|---|---|---|---|
| 5,408,559 A * | 4/1995 | Takahashi et al. ............. 385/89 |
| 5,611,006 A | 3/1997 | Tabuchi | |
| 5,867,622 A * | 2/1999 | Miyasaka et al. ............. 385/88 |
| 6,106,160 A * | 8/2000 | Kikuchi et al. ............. 385/88 |
| 6,282,000 B1 * | 8/2001 | Kikuchi et al. ............. 398/136 |
| 6,493,121 B1 * | 12/2002 | Althaus ............. 398/135 |
| 6,571,033 B2 * | 5/2003 | Caracci et al. ............. 385/24 |
| 6,731,882 B1 * | 5/2004 | Althaus et al. ............. 398/139 |
| 6,954,592 B2 * | 10/2005 | Tan et al. ............. 398/138 |
| 7,184,621 B1 * | 2/2007 | Zhu ............. 385/24 |
| 7,369,776 B2 * | 5/2008 | Masahiko ............. 398/138 |
| 7,450,858 B2 * | 11/2008 | Verdiell ............. 398/164 |
| 7,520,682 B2 * | 4/2009 | Eom et al. ............. 385/89 |
| 7,556,439 B2 * | 7/2009 | Nakanishi et al. ............. 385/92 |
| 2003/0147601 A1 | 8/2003 | Bartur et al. | |
| 2005/0201665 A1 | 9/2005 | Manderschied | |
| 2006/0083514 A1 * | 4/2006 | Liu et al. ............. 398/85 |

FOREIGN PATENT DOCUMENTS

JP 9211258 8/1997

OTHER PUBLICATIONS

PCT/US2008/054017, Jun. 30, 2008, International Search Report.
Huang et al. 'Optical Transceivers for Fiber-to-the-Premises Applications: System Requirements and Enabling Technologies' Journal of lightwave technology, vol. 25, No. 1, Jan. 2007, pp. 11-27.
CN 200880010772.6, Aug. 4, 2010, Office Action.

* cited by examiner

*Primary Examiner* — Agustin Bello
(74) *Attorney, Agent, or Firm* — Maschoff Gilmore & Israelsen

(57) ABSTRACT

Optical triplexers are disclosed. The optical triplexers include an optical fiber, a first ball lens optically coupling a first optical signal between a first opto-electronic device and a first wavelength selective filter, and a second ball lens optically coupling a second optical signal between a second opto-electronic device and the first wavelength selective filter. The optical triplexers further include a second wavelength selective filter optically coupling the first and second optical signals between the first wavelength selective filter and a third ball lens and a fourth ball lens optically coupling a third optical signal between a third optical signal between a third opto-electronic device and the second frequency selective filter. The second wavelength selective filter optical couples the third optical signal between the fourth ball lens and the third ball lens. Thus, each of the optical signals are selectively coupled between one of the opto-electronic devices and the optical fiber.

20 Claims, 1 Drawing Sheet

COLLIMATED BALL LENSES FOR OPTICAL TRIPLEXERS

CROSS-REFERENCE TO RELATED APPLICATIONS

This application claims the benefit of U.S. Provisional Patent Application No. 60/889,912, filed on Feb. 14, 2007, the contents of which are hereby incorporated by reference herein.

BACKGROUND

Interest in broadband optical access networks is growing, driven by an increasing demand for high-speed multimedia services. Optical access networks are often referred to as fiber-to-the-curb (FTTC), fiber-to-the-building (FTTB), fiber-to-the-premise (FTTP), or fiber-to-the-home (FTTH). Each such network provides an access from a central office to a building, or a home, via optical fibers. As the transmission quantity of such an optical cable is much greater than the bandwidth actually required by each subscriber, a passive optical network (PON) shared between many subscribers through a splitter was developed.

For the FTTH market, for example, bidirectional data transmission requires multiple elements to be packaged and aligned in the optoelectronic module including a Diplexer for upstream and down stream data transmission or a triplexer for video overlay plus the bi-directional data transmission. However, these devices are very cost-sensitive; especially so for triplexers because triplexers require high performance including high output power, high sensitivity, and low dispersion for all three optical signals.

Traditionally, an aspheric lens is used to obtain high coupling efficiency, for example greater than 50 percent. Aspheric lenses, however, are much more expensive than ball lenses. Further, if a single ball lens is used, maximum achievable coupling efficiency is often only thirty percent, or even as low as 10%-20% coupling efficiency may be obtained. Therefore, what would be advantageous are improved triplexers including high output power, high sensitivity, and low dispersion manufactured at a relatively low cost.

The subject matter claimed herein is not limited to embodiments that solve any particular disadvantages or that operate only in particular environments such as those described herein. Rather, such environments and disadvantages are provided only to illustrate examples of technology areas in which several embodiments may be practiced.

BRIEF SUMMARY OF SEVERAL EXAMPLE EMBODIMENTS

An optical triplexer is disclosed. The optical triplexer includes an optical fiber within which a triplexed optical signal is transmitted. The optical triplexer further includes a first ball lens optically coupling a first optical signal between a first opto-electronic device and a first wavelength selective filter. The optical triplexer further includes a second ball lens optically coupling a second optical signal between a second opto-electronic device and the first wavelength selective filter. The optical triplexer further includes a second wavelength selective filter optically coupling the first and second optical signals between the first wavelength selective filter and a third ball lens. The optical triplexer further includes a fourth ball lens optically coupling a third optical signal between a third opto-electronic device and the second frequency selective filter. The second wavelength selective filter optical coupling the third optical signal between the fourth ball lens and the third ball lens. Thus, each of the optical signals are selectively coupled between one of the opto-electronic devices and the optical fiber by two ball lenses.

An optical triplexer is disclosed that includes an optical fiber, a first optical subassembly, second optical subassembly, and third optical subassembly. The first optical subassembly includes a first ball lens disposed in a can of the first optical assembly and a first opto-electronic device. The second optical subassembly includes a second ball lens disposed in a can of the second optical subassembly and a second opto-electronic device. The third optical subassembly includes a fourth ball lens disposed in a can of the third optical subassembly and a third opto-electronic device. The optical triplexer further includes a first wavelength selective filter. The first ball lens optically couples a first optical signal between the first opto-electronic device and the first wavelength selective filter. The second ball lens optically coupling a second optical signal between a second opto-electronic device and the first wavelength selective filter. The optical triplexer further includes a second wavelength selective filter optically coupling the first and second optical signals between the first wavelength selective filter and a third ball lens. The second wavelength selective filter also optically coupling the third optical signal between the fourth ball lens and the third ball lens. Each of the optical signals is collimated by two ball lenses. The first opto-electronic device is configured to receive the first optical signal having an associated wavelength of about 1490 nanometers, the second opto-electronic device is configured to transmit the second optical signal having an associated wavelength of about 1310 nanometers, and the third opto-electronic device is configured to receive the third optical signal having an associated wavelength of about 1555 nanometers. The optical triplexer further including a first blocking filter configured to allow the first optical signal to pass through the first blocking filter to the first ball lens and configured to prevent other wavelengths of light reflected from the first wavelength selective filter from passing through the first blocking filter. The optical triplexer further including a second blocking filter configured to allow the third optical signal to pass through the second blocking filter to the fourth ball lens and configured to prevent the other wavelengths of light reflected from the second wavelength selective filter from passing through the second blocking filter.

These and other aspects of the present invention will become more fully apparent from the following description and appended claims.

BRIEF DESCRIPTION OF THE DRAWINGS

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SEVERAL EMBODIMENTS

The present invention relates to optical triplexers. Optical triplexers demultiplex and multiplex three optical signals between three opto-electronic devices and a single optical fiber. As referred to herein, an opto-electronic device can refer to an optical emitter or an optical detector. An example of an optical emitter is a laser or an light emitting diode (LED). Examples of lasers include edge emitting lasers, such as double heterostructure, quantum well, strained layer, distributed feedback, and distributed Bragg reflector lasers. Further examples of lasers include vertical cavity surface-emitting laser (VCSELs) which have vertical laser cavities that emit light normal to the plane of the semiconductor device. An example of an optical receiver include pin diodes, such as photodiodes, avalanche photodetectors, and metal-semiconductor-metal detectors.

Such opto-electronic devices are often contained in a TO-Can type optical package. Examples of TO-Can packages include TO-46 and TO-56 packages. TO-Can packages often include a metallic housing having opto-electronic device for transmitting or receiving data, a header upon which the opto-electronic device is situated, metal contact leads exiting from the diodes for connection to a power source, and a glass window opposed to the diode, through which the optical signals are transmitted. The TO-Can package is hermetically sealed. According to the embodiments disclosed herein, the glass window can be replaced with a ball lens through which the optical signals are transmitted. The ball lens collimates the optical signals transmitted through the ball lens.

Figure 1:
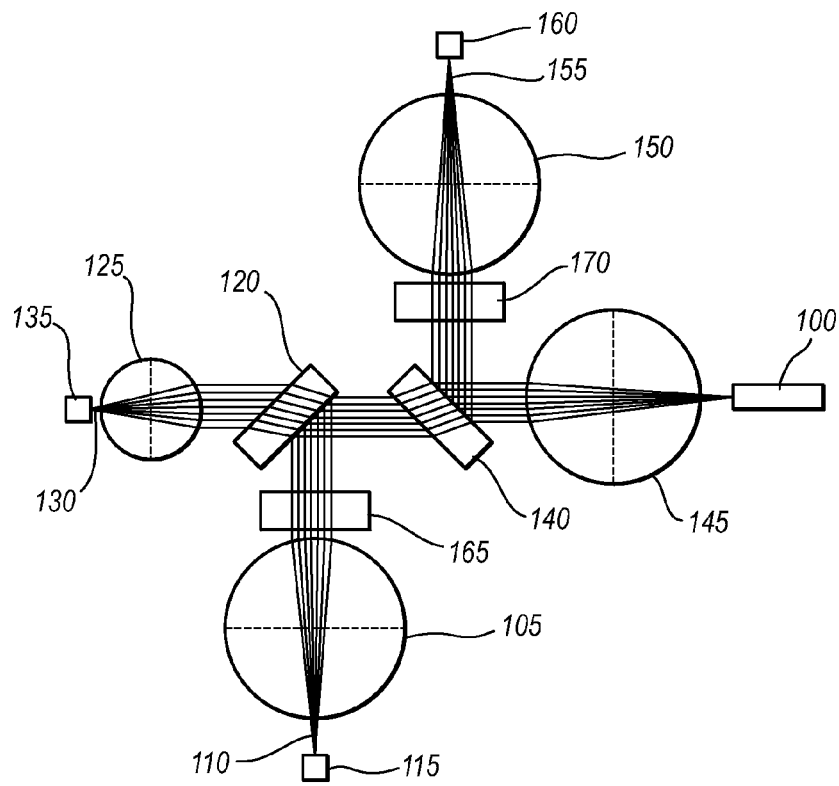
FIG. 1 discloses an optical layout of an optical triplexer.

Referring to FIG. 1 an optical layout of an optical triplexer is disclosed. The optical triplexer includes an optical fiber 100 within which a triplexed optical signal is transmitted. The triplexer further includes a first ball lens 105 optically coupling a first optical signal 110 between a first opto-electronic device 115 and a first wavelength selective filter 120. The optical triplexer further includes a second ball lens 125 optically coupling a second optical signal 130 between a second opto-electronic device 135 and the first wavelength selective filter 120. The optical triplexer further includes a second wavelength selective filter 140 optically coupling the first and second optical signals 110 and 130 between the first wavelength selective filter 120 and a third ball lens 145. The optical triplexer further includes a fourth ball lens 150 optically coupling a third optical signal 155 between a third opto-electronic device 160 and the second frequency selective filter 140. The second wavelength selective filter 140 also optically couples the third optical signal 155 between the fourth ball lens 150 and the third ball lens 145. Thus, each of the optical signals 110, 130, and 155 are selectively coupled between one of the opto-electronic devices 115, 135, and 160 and the optical fiber 100 by two of the ball lenses 105, 125, 145, and 150.

The opto-electronic devices 115, 135, and 160 are configured to transmit and/or receive an optical signal having an associated wavelength that is different from each of the other optoelectronic devices 115, 135, and 160. The optical wavelengths can be between 375 nanometers and 1800 nanometers.

In one example embodiment, the first opto-electronic device 115 includes an optical receiver configured to receive the first optical signal 110, the second opto-electronic device 135 includes an optical transmitter configured to transmit the second optical signal 130, and the third optoelectronic device 160 includes an optical receiver configured to receive the third optical signal 155. The first opto-electronic device 115 can be configured to receive the first optical signal 110 having an associated wavelength of about 1490 nanometers. The second opto-electronic device 135 can be configured to transmit the second optical signal 130 having an associated wavelength of about 1310 nanometers. The third opto-electronic device 160 can be configured to receive the third optical signal 155 having an associated wavelength of about 1555 nanometers. As referred to herein, about 1310 nanometers can refer to between 1290 and 1330 nanometers, about 1490 nanometers can refer to between 1480 and 1500 nanometers, and about 1555 nanometers can be between 1550 and 1560 nanometers.

The first wavelength selective filter 120 can be configured to reflect the first optical signal 110 and allow the second optical signal 130 to pass through the first frequency selective filter 120. For example, the first wavelength selective filter 120 can reflect light having a 1490 nanometers wavelength and allow light having a 1310 nanometer wavelength to pass through the first frequency selective filter 120. The second wavelength selective filter 140 can be configured to reflect the third optical signal 155 and allow the first and second optical signals 110 and 130 to pass through the second frequency selective filter 140. For example, the second wavelength selective filter 140 can be configured to reflect light having a 1555 nanometer wavelength and allow light having a 1490 nanometer wavelength and light having a 1310 nanometer wavelength to pass through the second wavelength selective filter 140.

The optical triplexer can further include a first blocking filter 165 configured to allow the first optical signal 110 to pass through the first blocking filter 165 to the first ball lens 105. The first blocking filter 165 can also be configured to prevent light reflected from the first ball lens 105 from passing through the first blocking filter 165. Therefore, any back reflection from the first ball lens 105 is prevented from being transmitted past the first blocking filter 165. For example, the first blocking filter 165 can be configured to allow only light associated with a wavelength of about 1490 nanometers to pass through the first blocking filter 165.

The optical triplexer can further include a second blocking filter 170 configured to allow the third optical signal 155 to pass through the second blocking filter to the third ball lens 150. The second blocking filter 170 can also be configured to prevent light reflected from the third ball lens 150 from passing through the second blocking filter 170. Therefore, any back reflection from the third ball lens 150 is prevented from being transmitted past the second blocking filter 170. For example, the second blocking filter 170 can be configured to allow only light associated with a wavelength of about 1555 nanometers to pass through the second blocking filter 170.

Figure 2:
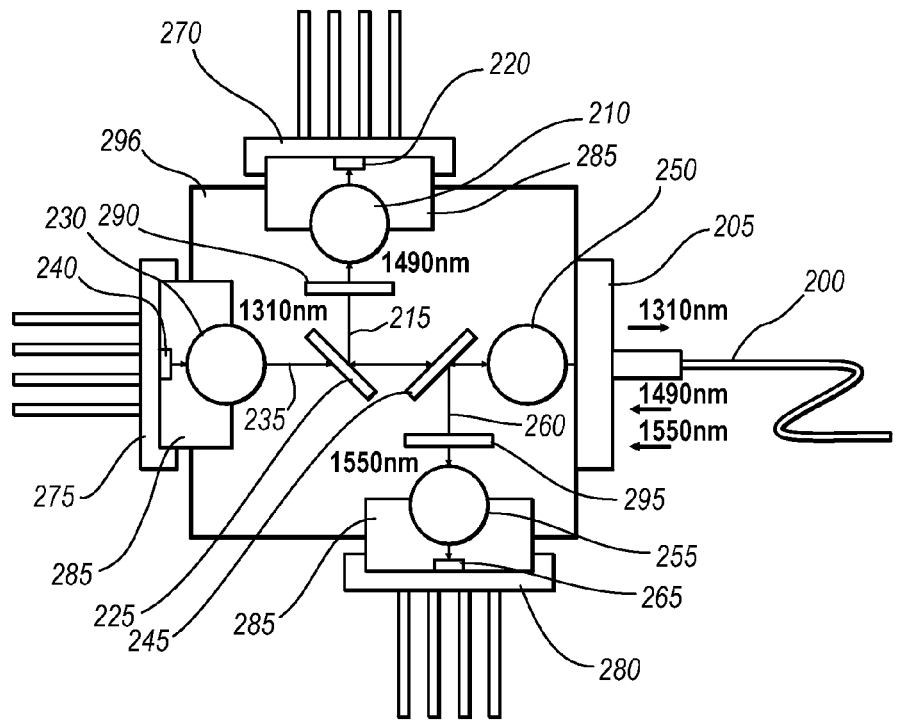
FIG. 2 discloses an example embodiment of the invention an optical triplexer.

Referring to FIG. 2, a second example embodiment of the invention is illustrated. Similar to FIG. 1, the embodiment of FIG. 2 illustrates an optical triplexer. The optical triplexer includes an optical fiber 200 within which a triplexed optical signal is transmitted. The optical fiber 200 is received by an optical fiber receptacle 205 configured to receive an end of the optical fiber 200.

The triplexer further includes a first ball lens 210 optically coupling a first optical signal 215 between a first opto-electronic device 220 and a first wavelength selective filter 225. The optical triplexer further includes a second ball lens 230 optically coupling a second optical signal 235 between a second opto-electronic device 240 and the first wavelength selective filter 225. The optical triplexer further includes a second wavelength selective filter 245 optically coupling the first and second optical signals 215 and 235 between the first wavelength selective filter 225 and a third ball lens 250. The optical triplexer further includes a fourth ball lens 255 optically coupling a third optical signal 260 between a third opto-electronic device 265 and the second frequency selective filter 245. The second wavelength selective filter 245 optical couples the third optical signal 260 between the fourth ball lens 255 and the third ball lens 250. Thus, each of the optical signals 215, 235, or 260 are selectively coupled between one of the opto-electronic devices 220, 240, or 265 and the optical fiber 200 by two ball lenses.

Each of the opto-electronic devices 220, 240, and 265 are contained within an optical subassembly. For example, the first opto-electronic device 220 is contained within a first optical subassembly 270, the second opto-electronic device 240 is contained in a second opto-electronic subassembly 275, and the third opto-electronic device 265 is contained in a third opto-electronic subassembly 280. Each of the optical subassemblies 270, 275, and 280 includes a header, leads for providing power for signals sent to and/or from the opto-electronic devices 220, 240, and 265.

Each of the optical subassemblies 270, 275, and 280 further includes a can 285. According to the embodiment illustrated in FIG. 2, the first ball lens 210 is incorporated into the can 285 of the first optical subassembly 270, the second ball lens 230 is incorporated in to the can 285 of the second optical subassembly 275, and the fourth ball lens 255 is incorporated into the can 285 of the third optical subassembly 280.

Each of the optical subassemblies 270, 275, and 280 can be any type of optical package. For example, the optical subassemblies 270, 275, and 280 can be a TO-Can type optical package including a header, can, and one of the first, second, or fourth ball lenses 210, 230, or 255.

The opto-electronic devices 220, 240, and 265 are configured to transmit and/or receive an optical signal having an associated wavelength that is different form each of the other optoelectronic devices. The optical wavelengths can be between 375 nanometers and 1800 nanometers.

In one example embodiment, the first opto-electronic device 220 includes an optical receiver configured to receive the first optical signal 215, the second opto-electronic device 230 includes an optical transmitter configured to transmit the second optical signal 235, and the third optoelectronic device 265 includes an optical receiver configured to receive the third optical signal 260. The first opto-electronic device 220 can be configured to receive the first optical signal 215 having an associated wavelength of about 1490 nanometers. The second opto-electronic device 240 can be configured to transmit the second optical signal 235 having an associated wavelength of about 1310 nanometers. The third opto-electronic device 265 can be configured to receive the third optical signal 260 having an associated wavelength of about 1555 nanometers.

The first wavelength selective filter 225 can be configured to reflect the first optical signal 215 and allow the second optical signal 235 to pass through the first frequency selective filter 225. For example, the first wavelength selective filter 225 can reflect light having a 1490 nanometers wavelength and allow light having a 1310 nanometer wavelength to pass through the first frequency selective filter 225. The second wavelength selective filter 245 can be configured to reflect the third optical signal 260 and allow the first and second optical signals 215 and 235 to pass through the second frequency selective filter 245. For example, the second wavelength selective filter 245 can be configured to reflect light having a 1555 nanometer wavelength and allow light having a 1490 nanometer wavelength and light having a 1310 nanometer wavelength to pass through the second wavelength selective filter 245.

The optical triplexer can further include a first blocking filter 290 configured to allow the first optical signal 215 to pass through the first blocking filter 290 to the first ball lens 210. The first blocking filter 290 can also be configured to prevent light reflected from the first ball lens 210 from passing through the first blocking filter 290. Therefore, any back reflection from the first ball lens 210 is prevented from being transmitted past the first blocking filter 290. For example, the first blocking filter 2290 can be configured to allow only light associated with a wavelength of about 1490 nanometers to pass through the first blocking filter 290.

The optical triplexer can further include a second blocking filter 295 configured to allow the third optical signal 260 to pass through the second blocking filter 295 to the third ball lens 255. The second blocking filter 295 can also be configured to prevent light reflected from the third ball lens 255 from passing through the second blocking filter 295. Therefore, any back reflection from the third ball lens 255 is prevented from being transmitted past the second blocking filter 295. For example, the second blocking filter 295 can be configured to allow only light associated with a wavelength of 1555 nanometers to pass through the second blocking filter 295.

The optical triplexer can further include a housing 296. The housing 296 encloses the first and second frequency selective filters 225 and 245 and the third ball lens 250. The housing 296 includes openings for receiving the can portion 285 of the first, second, and third optical subassemblies 270, 275, and 280 containing the first, second, and third opto-electronic devices 220, 240, and 265 respectfully.

Thus, in the embodiment of FIGS. 1 and 2, two ball lenses are used with collimated beams of optical signals between them to achieve relatively high coupling. For example, such coupling may result in about 50%, or more, coupling efficiency as opposed to conventional embodiments.

The embodiments disclosed herein may operate at any other optical wavelengths. Moreover, the wavelengths of the signals can be exchanged, substituted, or otherwise varied. For example, any of the optical signals, such as those shown in FIGS. 1 and 2, can have any wavelength between 375 nanometers and 1800 nanometers. The wavelength of the first optical signal can have the wavelength disclosed for the second optical signal or the third optical signal, or vice versa, so long as each optical signal has a different wavelength. Therefore, the invention is not limited to those specific wavelengths disclosed as examples herein.

The embodiments disclosed herein may exhibit one or more benefits over the prior art. For example, the embodiments may have relatively high laser to fiber coupling efficiency and low cost. The embodiments may have better optical filter performance (lower insertion loss and high isolation) because they are placed in the collimated beam. The embodiments may have better stability since coupling is not sensitive to angular movement of filters. The embodiments may have longer working distance which makes the design flexible such as adding extra components between 2 lenses without changing other parts. The embodiments may have lower aberration for receiver optics which also increases the receiver sensitivity and stability.

The subject matter claimed herein is not limited to embodiments that solve any particular disadvantages or that operate only in particular environments such as those described herein. The embodiments are not limited to any desired efficiencies or insertion benefits. Rather, such environments, advantages, and disadvantages are provided only to illustrate examples of technology areas in which several embodiments may be practiced.

It should be understood that the drawings are diagrammatic and schematic representations of such example embodiments and, accordingly, are not limiting of the scope of the present invention, nor are the drawings necessarily drawn to scale. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. Detailed descriptions of apparatus and processing techniques known in the field of the invention to one of ordinary skill in the art have been excluded.

We claim:
1. An optical triplexer comprising:
an optical fiber;
a first ball lens positioned between a first optical receiver and a first wavelength selective filter;
a second ball lens positioned between an optical transmitter and the first wavelength selective filter;
a second wavelength selective filter positioned between the first wavelength selective filter and a third ball lens; and
a fourth ball lens positioned between a second optical receiver and the second frequency selective filter.

2. An optical triplexer according to claim 1, wherein the first optical receiver is configured to receive a first optical signal having a first wavelength, the optical transmitter is configured to emit a second optical signal have a second wavelength different from the first wavelength, and the second optical receiver is configured to receive a third optical signal having a third wavelength different than the first and second wavelengths.

3. An optical triplexer according to claim 2, wherein the first optical receiver includes a photodiode configured to receive the first optical signal, the optical transmitter includes a laser configured to transmit the second optical signal, and the second optical receiver includes a photodiode configured to receive the third optical signal.

4. An optical triplexer according to claim 2, wherein the first wavelength is about 1490 nanometers, the second wavelength is about 1310 nanometers, and the third wavelength is about 1555 nanometers.

5. An optical triplexer according to claim 1, wherein each of the first optical receiver, optical transmitter, and second optical receiver is configured to transmit and/or receive an optical signal having a different associated wavelength between 375 nanometers and 1800 nanometers.

6. An optical triplexer according to claim 2, wherein the first frequency selective filter is configured to reflect the first optical signal and is configured to allow the second optical signal to pass through the first frequency selective filter.

7. An optical triplexer according to claim 6, wherein the first wavelength selective filter is configured to reflect light associated with a 1490 nanometers wavelength and is configured to allow light associated with a 1310 nanometer wavelength to pass through the first frequency selective filter.

8. An optical triplexer according to claim 6, wherein the second frequency selective filter is configured to reflect the third optical signal and is configured to allow the first and second optical signals to pass through the second frequency selective filter.

9. An optical triplexer according to claim 6, further comprising a first blocking filter configured to allow the first optical signal to pass through the first blocking filter to the first ball lens and configured to prevent light reflected from the first ball lens from passing through the first blocking filter.

10. An optical triplexer according to claim 9, further comprising a second blocking filter configured to allow the third optical signal to pass through the second blocking filter to the fourth ball lens and configured to prevent light reflected from the fourth ball lens from passing through the second blocking filter.

11. An optical triplexer according to claim 10, wherein the first blocking filter allows only light associated with a wavelength of about 1490 nanometers to pass through the first blocking filter; and the second blocking filter allows only light associated with a wavelength of about 1555 nanometers to pass through the second blocking filter.

12. An optical triplexer according to claim 1, wherein each of the first optical receiver, optical transmitter, and second optical receiver is contained within an optical subassembly.

13. An optical triplexer according to claim 12, wherein the first ball lens is incorporated into a can of a first optical subassembly within which the first optical receiver is disposed, the second ball lens is incorporated into a can of a second optical subassembly within which the optical transmitter is disposed, and the third ball lens is incorporated into a can of a third optical subassembly within which the second optical receiver is disposed.

14. An optical triplexer according to claim 1, further comprising a housing, the housing enclosing the first and second frequency selective filters and third ball lens, the housing including openings for receiving a can portion of a first, second, and third optical subassemblies containing the first optical receiver, optical transmitter, and second optical receiver respectively.

15. An optical triplexer according to claim 14, wherein the can portion of the first, second, and third optical subassemblies include the first, second, and fourth ball lenses respectively.

16. An optical triplexer according to claim 14, wherein each of the optical subassemblies include a TO-Can type package including a header, can, and one of the first, second, or fourth ball lenses.

17. An optical triplexer according to claim 1, wherein:
each of the first and second optical receivers comprises a photodiode, avalanche photodetector, or metal-semiconductor-metal detector; and
the optical transmitter comprises a distributed feedback laser or a distributed Bragg reflector laser.

18. An optical triplexer comprising:
an optical fiber receptacle configured to receive an end of an optical fiber;
a first wavelength selective filter;
a first optical subassembly including:
a first ball lens disposed in a can of the first optical assembly; and
a first optical receiver configured to receive a first optical signal, wherein the first ball lens is positioned between the first wavelength selective filter and the first optical receiver;
a second optical subassembly including:
a second ball lens disposed in a can of the second optical subassembly; and
an optical transmitter configured to emit a second optical signal, wherein the second ball lens is positioned between the first wavelength selective filter and the optical transmitter;
a third ball lens positioned between the optical fiber receptacle and the first wavelength selective filter;
a second wavelength selective filter positioned between the first wavelength selective filter and the third ball lens;
a third optical subassembly including:
a fourth ball lens disposed in a can of the third optical subassembly; and second optical receiver configured to receive a third optical signal, wherein the fourth ball lens is positioned between the second wavelength selective filter and the second optical receiver;

a first blocking filter configured to allow the first optical signal to pass through the first blocking filter to the first ball lens and configured to prevent light reflected from the first ball lens from passing through the first blocking filter; and a second blocking filter configured to allow the third optical signal to pass through the second blocking filter to the fourth ball lens and configured to prevent light reflected from the fourth ball lens from passing through the second blocking filter, wherein:

each of the optical signals is collimated by a different set of two ball lenses selected from a group including the first, second, third and fourth ball lenses;

the first optical signal has a wavelength in a range from about 1480 nanometers to about 1500 nanometers;

the second optical signal has a wavelength in a range from about 1290 nanometers to about 1330 nanometers; and the third optical signal has a wavelength in a range from about 1550 nanometers to about 1560 nanometers.

19. An optical triplexer according to claim 18, wherein each of the optical subassemblies includes a TO-46 or TO-56 type optical package.

20. An optical triplexer according to claim 18, wherein:

each of the first and second optical receivers comprises a photodiode, avalanche photodetector, or metal-semiconductor-metal detector; and the optical transmitter comprises a distributed feedback laser or a distributed Bragg reflector laser.

* * * * *